(12) United States Patent
Clark, III et al.

(10) Patent No.: US 10,462,181 B2
(45) Date of Patent: Oct. 29, 2019

(54) METHOD, SYSTEM, AND APPARATUS TO IDENTIFY AND STUDY ADVANCED THREAT TACTICS, TECHNIQUES AND PROCEDURES

(71) Applicant: QUADRANT INFORMATION SECURITY, Jacksonville, FL (US)

(72) Inventors: Champ Clark, III, Jacksonville Beach, FL (US); Robert Alvin Nunley, Jacksonville, FL (US)

(73) Assignee: QUADRANT INFORMATION SECURITY, Jacksonville, FL (US)

( * ) Notice: Subject to any disclaimer, the term of this patent is extended or adjusted under 35 U.S.C. 154(b) by 157 days.

(21) Appl. No.: 15/590,540

(22) Filed: May 9, 2017

(65) Prior Publication Data

US 2017/0331858 A1   Nov. 16, 2017

Related U.S. Application Data

(60) Provisional application No. 62/333,947, filed on May 10, 2016.

(51) Int. Cl.
*H04L 29/06* (2006.01)
*G06F 21/55* (2013.01)

(52) U.S. Cl.
CPC ........ *H04L 63/1491* (2013.01); *G06F 21/552* (2013.01); *H04L 63/1416* (2013.01)

(58) Field of Classification Search
CPC . H04L 63/1491; H04L 63/308; H04L 63/302; H04L 63/1416; H04L 63/1425; G06F 21/552

See application file for complete search history.

(56) References Cited

U.S. PATENT DOCUMENTS 8,561,187 B1 * 10/2013 Hegli .................. H04L 63/1491
                                                         726/22
8,839,417 B1 *  9/2014 Jordan ................ H04L 63/0227
                                                         726/22

(Continued)

FOREIGN PATENT DOCUMENTS

WO    WO-2016042587 A1 *  3/2016 ............. G06F 21/53

OTHER PUBLICATIONS

Provos, A Virtual Honeypot Framework, Oct. 21, 2003, http://www.citi.umich.edu/techreports/reports/citi-tr-03-1.pdf.*

*Primary Examiner* — Ali S Abyaneh
*Assistant Examiner* — Shu Chun Gao
(74) *Attorney, Agent, or Firm* — Seyfarth Shaw LLP; Brian Michaelis

(57) ABSTRACT

The present disclosure provides an information technology security system, method and apparatus that differentiates advanced attackers from unsophisticated attackers by querying a proprietary Threat Intelligence database that houses known attack and attacker information. Advanced attackers are proxied, or filtered, into a virtual honeypot where their tools, methods, and attack procedures can be recorded and studied. Context and back story are implemented into the honeypot to make it appear as real as possible by using a hardware "host" device located at the customer site that transparently forwards all traffic it receives into the virtual honeypot where the customer's network environment is re-created. Advanced attackers are filtered into this virtual honeypot where the tools and attack strategies that they otherwise would keep secret can be logged, examined, and researched.

20 Claims, 18 Drawing Sheets

(56) References Cited

U.S. PATENT DOCUMENTS

| | | | |
|---|---|---|---|
| 8,943,594 B1* | 1/2015 | Arrowood | G06F 21/53 |
| | | | 726/23 |
| 9,356,942 B1* | 5/2016 | Joffe | H04L 63/1408 |
| 9,503,470 B2* | 11/2016 | Gertner | H04L 63/145 |
| 9,516,058 B2* | 12/2016 | Antonakakis | H04L 63/1483 |
| 9,667,651 B2* | 5/2017 | Shulman | H04L 63/1416 |
| 9,686,296 B1* | 6/2017 | Murchison | H04L 41/06 |
| 9,705,920 B1* | 7/2017 | Ramalingam | H04L 63/20 |
| 9,923,922 B1* | 3/2018 | Brown, Jr. | H04L 63/1491 |
| 9,954,893 B1* | 4/2018 | Zhao | G06F 16/958 |
| 10,044,675 B1* | 8/2018 | Ettema | H04L 63/0227 |
| 2015/0365438 A1* | 12/2015 | Carver | H04L 63/1441 |
| | | | 726/1 |
| 2016/0044054 A1* | 2/2016 | Stiansen | H04L 63/1416 |
| | | | 726/24 |

* cited by examiner

METHOD, SYSTEM, AND APPARATUS TO IDENTIFY AND STUDY ADVANCED THREAT TACTICS, TECHNIQUES AND PROCEDURES

FIELD

The present disclosure relates generally to information security for capturing network exploit efforts by advanced attackers in a segregated environment. More particularly, the present disclosure relates to the filtering of advanced computer attackers into a segregated network where they conduct reconnaissance, enumeration, and exploit efforts while being monitored and while alerting security personnel. Still more particularly, the present disclosure relates to the detection and identification of targeted attacks.

BACKGROUND

Network and computer security researchers use honeypots as a means to gather information about different types of attacks and attackers. The idea of a honeypot is to set up a computer system or network that appears to be vulnerable to certain types of attacks in order to attract attackers to exploit it. However, when the honeypot is attacked, the data from the attack can be collected and analyzed.

Attackers know about honeypots and try to avoid them. From the attacker's point of view, honeypots are a waste of resources that might give security researchers clues about their attack methods. It is therefore in their best interest to avoid honeypots and not interact with them. In turn, security researchers attempt to hide the fact that they are running a honeypot by using technological means to create a back story that provides context to make the honeypot appear more real. For example, if a security researcher is running a web-based honeypot, they might create an authentic looking website in order to trick the attacker into believing that it is legitimate. To that end, they might also register domain names in an attempt to provide context for the honeypot. Creating a honeypot that appears real, with a detailed context, is difficult to accomplish. Typically, with a few web searches, an advanced attacker can quickly determine if the back story and the context are real or whether they are being tricked. Upon determining that the site (i.e., the honeypot) is a hoax, the potential attacker will typically ignore it and move on.

Advanced attackers also seek out and target specific organizations to exploit. The location of the honeypot on the Internet can serve as an indicator to an attacker. For example, a security research team might want to set up a honeypot to simulate being a petroleum fuel pump station. An advanced attacker would likely expect this fuel pump station to be located in a network belonging to a petroleum company. If the attacker discovers that the fuel pump station simulated by the honeypot is connected to the Internet via a residential connection, they will likely believe it to be a hoax (i.e. identify it as a honeypot) and ignore it. Additional examples include advanced attackers understanding that medical equipment is more likely to be seen within a hospital computer network, or that air traffic control systems are more likely to be seen in an airport network environment. If the attacker discovers that these systems reside in places other than where they expected them to, in other words—if the context of the honeypot is not accurate enough—they will likely ignore that honeypot and move on to other networks.

As such, it is difficult to create an authentic context to a honeypot if the system is not located where an attacker would expect it to be. Nonetheless, capturing information gathered by honeypots is extremely important in understanding the tools and strategies attackers use to target and exploit specific networks. In other words, security researchers want attackers to believe that the honeypots are real in order to capture critical information in understanding the attack mechanisms and technologies used by advanced attackers.

One solution to provide context is to place the honeypot within an actual working environment. In this way, the context and the back story for the honeypot are already there and are accurate. For example, it might be possible to get permission to place a honeypot within the petroleum company's network. However, this solution is often impossible to execute because there is an inherent risk to the company hosting the honeypot in that it can leave itself vulnerable to the attacker, given the possibility that the attacker might have inadvertent access to the company's network should they escape or otherwise exploit the honeypot. More specifically, as with all technology, running a honeypot is not without its own risks. There is a possibility that the honeypot might be exploited in such a way that it can be used as an attack platform on the targeted company if it is placed within their network. Not surprisingly, it is common for organizations to refuse to place honeypots within their network.

Another problem introduced by the use of traditional honeypots is the poor or insufficient quality of the data collected. Attacks on the Internet are very common and it is typical for an organization to be probed and scanned hundreds, if not thousands, of times per day. However, most of the scans are initiated by unsophisticated attackers who are scanning the Internet for low-hanging fruit (i.e., easy targets to attack and exploit). Typically, these unsophisticated attackers use the following methodology: 1.) they find an exploit for a vulnerability in the software running on specific servers; 2.) they write or purchase a program to scan the Internet looking for those specific servers running the vulnerable software for which they have the exploit; and 3.) if they identify servers found to be vulnerable, they run the exploit in order to infect or access them. This type of attacker does not target any specific organization, nor do they care if they are detected. Because they are indiscriminate in selecting targets, they will typically also inadvertently attack honeypots. Security researchers can then detect, collect, and analyze the attack data provided from these honeypots. However, these data are not particularly useful or informative because the tools and methods used by unsophisticated attackers are likely well-known and well-researched already.

Much less information is available on the attacks used by advanced attackers. These types of attackers typically do not use the same approach as less sophisticated attackers because they do not want to advertise the tools and methods that they use. These types of attackers will target specific networks and might use previously unpublished techniques and methods, which they wish to keep secret. To date, generic honeypots do not provide the proper context to attract advanced attackers as they are too easily detected.

SUMMARY

The present disclosure addresses the aforementioned problems by providing a novel system, method and apparatus differentiating unsophisticated attackers from advanced attackers, filtering only advanced attackers into a honeypot. The system, method and apparatus according to the present disclosure provides the accurate context and back story needed in order for a honeypot to appear real. By being a piece of hardware that hosts software placed directly into the customer's network, it forwards all attack traffic into a secured virtual environment (which mirrors the customer's network configuration but resides outside of the customer's network and away from their resources).

The present disclosure describes a "host device" that may be a low-powered, small computer that is located within the targeted organization's network. Since the device is located within the targeted network, to attackers, it will appear to be a valid device that the organization operates. Therefore, the device inherits the context of the organization by virtue of being located within the organization's network. From an attacker's point of view, the device is less likely to be a honeypot because it appears to have a legitimate function within the targeted organization's network.

The device acts as a relay or proxy for an attack. When the device receives a connection from an advanced attacker, it transparently relays or proxies the connection to an off-premise virtualized environment. This virtualized environment acts as a virtual honeypot, emulating a system that might typically be found within the targeted organization's network. From the attacker's perspective, it appears as though they are attacking an asset within the targeted organization. In reality, the attack is being relayed off-site to mitigate risk to the targeted organization.

The virtual honeypot targets that are being attacked can be both low-interactive and high-interactive honeypots. Low-interactive honeypots give the appearance of being vulnerable to certain types of attacks without allowing full interaction with the target, whereas high-interactive honeypots allow the attacker full control and access to the targeted system after a successful attack. High-interactive honeypots are used to collect more specific data about tactics and techniques that the attacker uses. Both types of honeypots can be used depending on customer preference and what type of information collection is desired.

Once the attacker is proxied into the virtual honeypot, the attacker uses their tools to "compromise" the virtual honeypot and gain access. The attacker is then presented with a computer system (the now "compromised target") and is given visibility into the virtualized organization network that mimics the network infrastructure of the intended target. In essence, the attacker will believe that they are inside the real organization's network, when in fact, the honeypot mimics that infrastructure in a virtual environment where the attacker can do no damage to the actual targeted organization. The utility of trapping an attacker in this type of honeypot is that more data can be collected about the tools and methodologies the attacker used to "breach" the target network. If the attacker attempts to exfiltrate data out of the virtual honeypot, all traffic is passed back through the host device, further giving the attacker the illusion that they have successfully penetrated a network.

BRIEF DESCRIPTION OF THE DRAWINGS

The above and other features of the present disclosure are described in the following Detailed Description and shown in the following drawings.

DETAILED DESCRIPTION

Aspects of the present disclosure provide a novel solution designed to provide organizations with the benefits of managed and monitored high- and low-interaction honeypots, without the risk typically inherent in such endeavors. According to the present system, method and apparatus of the disclosure: 1.) advanced attackers are differentiated from unsophisticated attackers by querying a proprietary Threat Intelligence database that houses known attack and attacker information; 2.) advanced attackers are proxied into a virtual honeypot where their tools, methods, and attack procedures can be recorded and studied; and 3.) context and back story are brought into the honeypot to make it appear real by using a hardware device located at the customer site that transparently forwards all traffic it receives into the virtual honeypot where the customer's network environment is re-created.

Using these virtual honeypots to capture advanced attackers accomplishes five primary goals: 1.) If the attacker is reasonably certain that they have successfully penetrated the organization's network and computers, they are more likely to deploy tactics and techniques that they otherwise keep secret; 2.) The more time the attacker spends in the virtual honeypot, the more time and resources they are wasting not targeting the true organization's network; 3.) If the attacker is certain that they have successfully compromised a system, the more effort and tools they will use to further penetrate the system, resulting in better attack data; 4.) The true targeted organization can be informed of the attack, the tools used, and the tactics employed and these data can be used to further secure the true organization's network from future attacks; and 5.) The attack data can be shared with other organizations to prevent and detect past and future attacks.

Figure 1A:
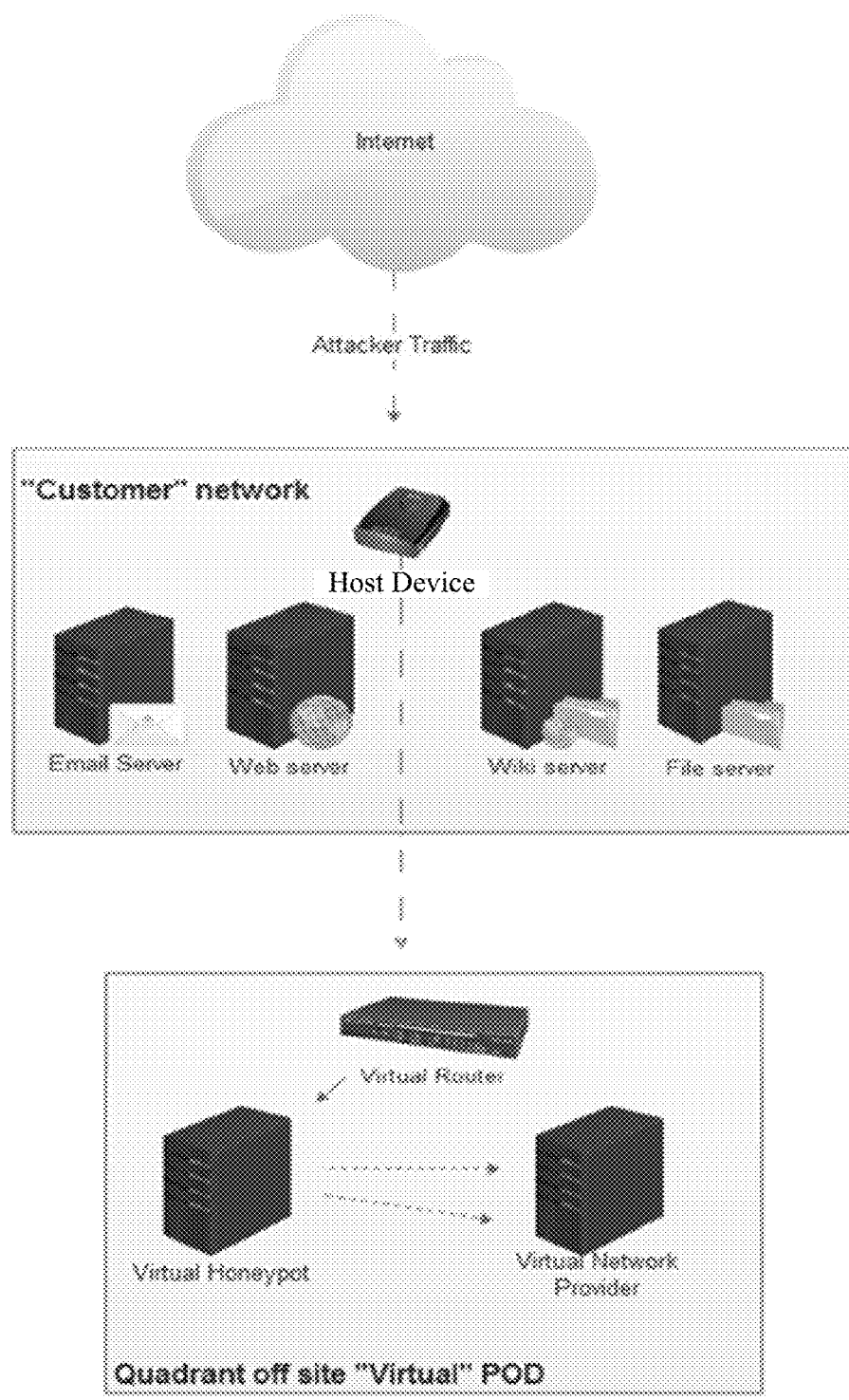
FIG. 1A illustrates the positioning of the host device in relation to the customer and virtual honeypot networks and how traffic from the attacker is transparently filtered through to the host device, according to the disclosure.
Figure 1B:
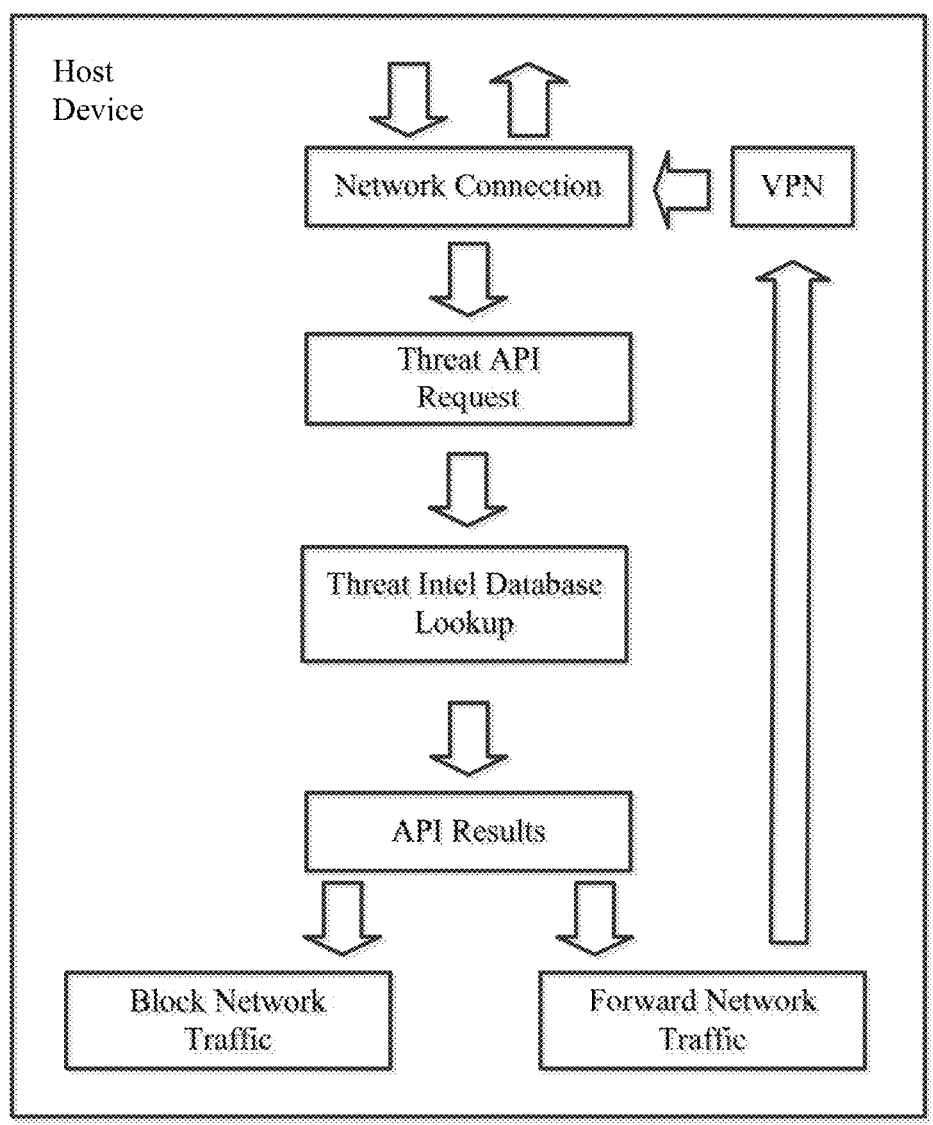
FIG. 1B is a block diagram of the host device that manages network traffic to the virtual honeypot.

One component of the present disclosure is that it operates as a filtering mechanism. While traditional honeypots are useful in gathering data about attackers who are initiating mass scans of the Internet, these types of attackers are typically scanning for low-hanging fruit and data gathered are not particularly useful. The present disclosure allows researchers to gather more detailed information on advanced attackers, those who specifically target organizations. To accomplish this goal, the host device filters out the less advanced, unsophisticated attackers and only allows the more advanced attackers access to the virtual honeypot. FIG. 1A illustrates how the host device is positioned in relation to the customer network and the virtual honeypot, and FIG. 1B is a block diagram of the host device that manages network traffic to the virtual honeypot.

An attacker establishes a network connection between their computing device ("attacker computing device") and the host device. The host device sends an application programming interface (API) request to the Threat Intelligence database which includes attacker computing device identifying information such as Internet Protocol (IP) address information, etc. In order to filter out unsophisticated attackers, the host device uses the information from the API request to determine whether the attacker computing device has been associated with other attacks in the past. For example, the host device may perform a lookup of the attacker computing device's IP address. This is done through an API call-back to the Threat Intelligence database. The Threat Intelligence database is an existing database that contains data collected from previous attacks through the use of honeypots as well as other means. In essence, the host device queries the Threat Intelligence database and asks whether it should allow the attacker's connection to the honeypot or whether it should block it. The API will return a response/result of either "Yes" or "No".

Figure 2:
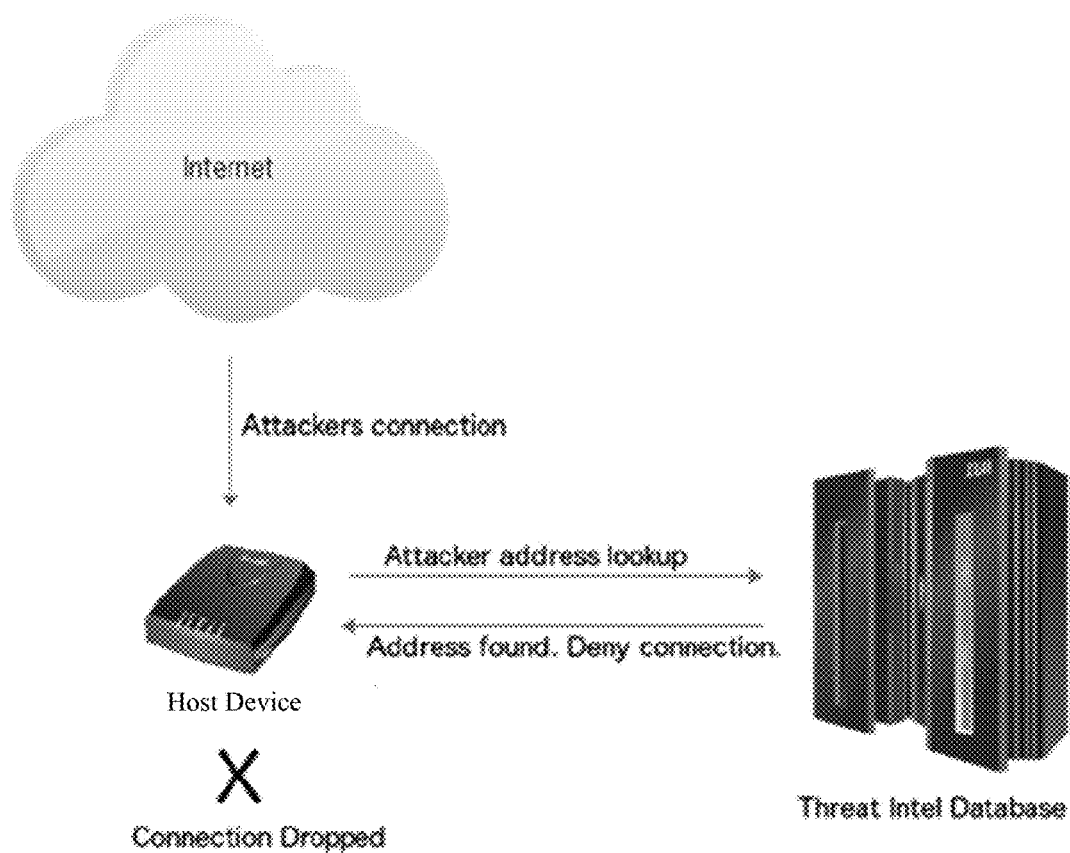
FIG. 2 illustrates how the attacker's connection to the host device is dropped if they are identified as an unsophisticated attacker by querying the Threat Intelligence database.

The API will answer "No" if the attacker is a well-known unsophisticated attacker looking for low-hanging fruit. In other words, if attacker computing device information is already stored in the Threat Intelligence database, it is likely that they have previously attacked low-hanging honeypots. In this situation, the device protects the virtualized honeypot environment from compromise by this unsophisticated attacker by dropping the traffic, as illustrated in FIG. 2. These types of attackers are blocked from access because data on their tactics and tools already exist in the database.

Figure 3:
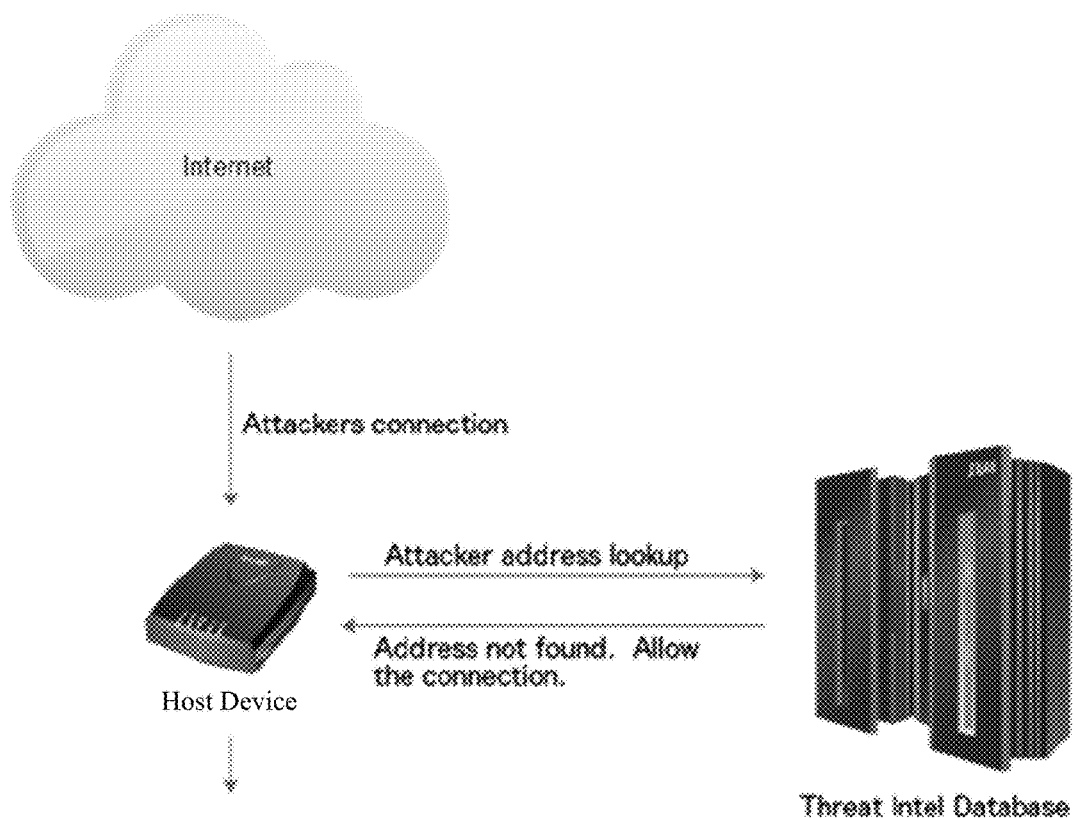
FIG. 3 illustrates how the attacker's connection to the virtual honeypot is allowed if the Threat Intelligence database does not recognize them as an unsophisticated attacker.

Advanced attackers typically do not perform mass scans and prefer to use specialized tools that have not previously been seen. Advanced attackers typically like to work from a "clean" IP address; an address that has not been associated with past attacks. If the attack is coming from a clean IP address, the API will answer "Yes". A clean IP address would indicate that attacks have not been recorded in the past from that address and would be of interest. Since the attack is coming from a clean address, the connection is then relayed to the virtualized honeypot environment where data can be further collected and monitored, as seen in FIG. 3. Put another way, if the attacker computing device information is not contained within the Threat Intelligence database, the API result is "Yes" and the host device forwards network traffic from the attacker computing device to a virtual private network.

Another novel component of the present disclosure is that its network interface only permits the device to initiate a virtual private network (VPN) tunnel connection to a VPN server at a remote location. The host device may be placed within a demilitarized zone (DMZ) environment where it can receive traffic via network address translation (NAT) or port address translation (PAT), although other configurations are also possible. All traffic received by the host device, whether initiated by a malicious actor outside of the organization's network or within it, is relayed through the VPN tunnel to the VPN server. The VPN server forwards traffic from the host device to the high-interaction or low-interaction honeypot via a TAP interface (network tap). The honeypot responds to the attacker through a VPN and TAP layered connection which does not decrement the Internet protocol (IP TTL), providing the illusion that the honeypot is a computing system within the organization that is targeted. Response traffic from the honeypot to the malicious actor travels the VPN/TAP, arrives at the host device, and is forced back to the original source. The network relay between the host device, the VPN server, and the honeypot is transparent, meaning that the network traffic traveling through the relay is returned to the initial source through the point at which communications were initiated. This is beneficial because it maintains the integrity of the network.

Deployment of the teachings of the present disclosure may contain the following elements; 1.) The Host Device—this device may be a mini computer with an installed operating system; access control lists (ACLs) may limit the device from initiating, or responding to, any network connections with the exception of traffic via the VPN tunnel to the virtual honeypot network; 2.) VPN Server—the VPN server accepts the secure VPN tunnel initiated by the host device and allows traffic to be passed to the honeypot; 3.) Honeypot—the high/low-interaction honeypot is a virtual machine which responds to network communications forwarded through the host device; and 4.) Decoy Network—the decoy network is a virtual network hosted on a virtual machine.

Figure 4:
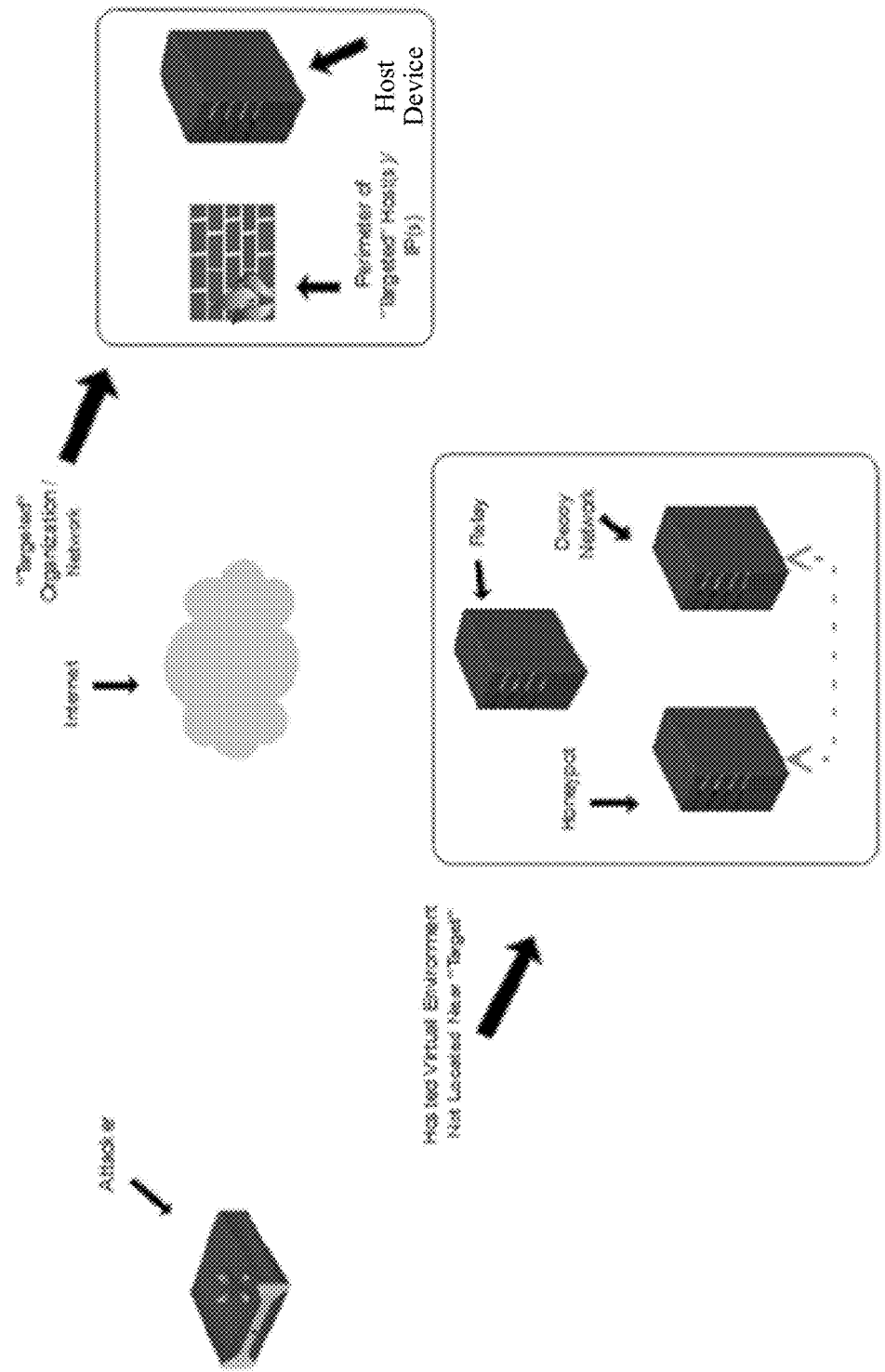
FIG. 4 illustrates how an attacker is positioned in relation to the host device, the target organization's network, and the honeypot system.
Figure 5:
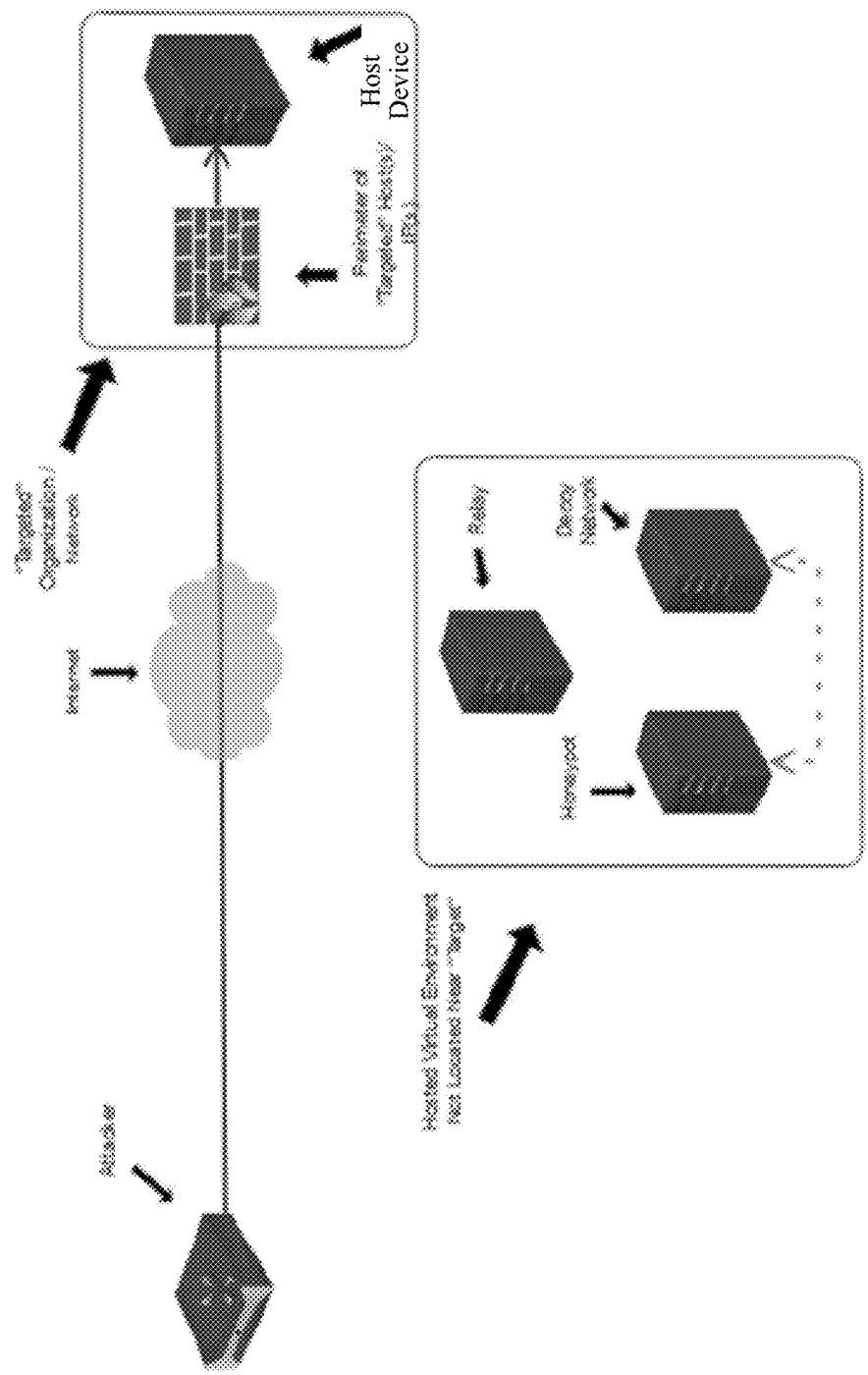
FIG. 5 illustrates the network traffic generated by the attacker targeted at the host device located in the target organization's network.
Figure 6:
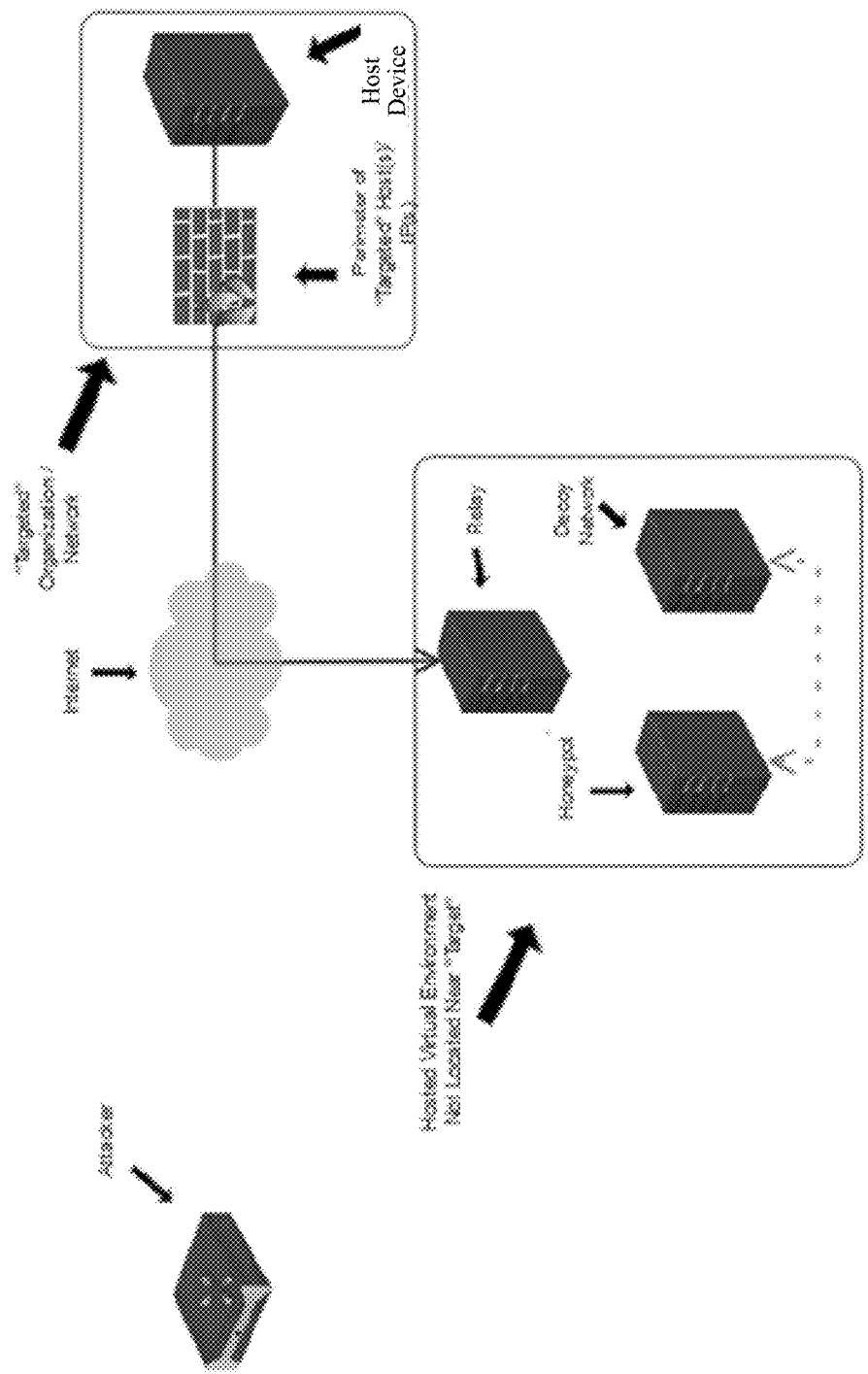
FIG. 6 illustrates that the attacker's traffic is transparently relayed through the VPN tunnel.
Figure 7:
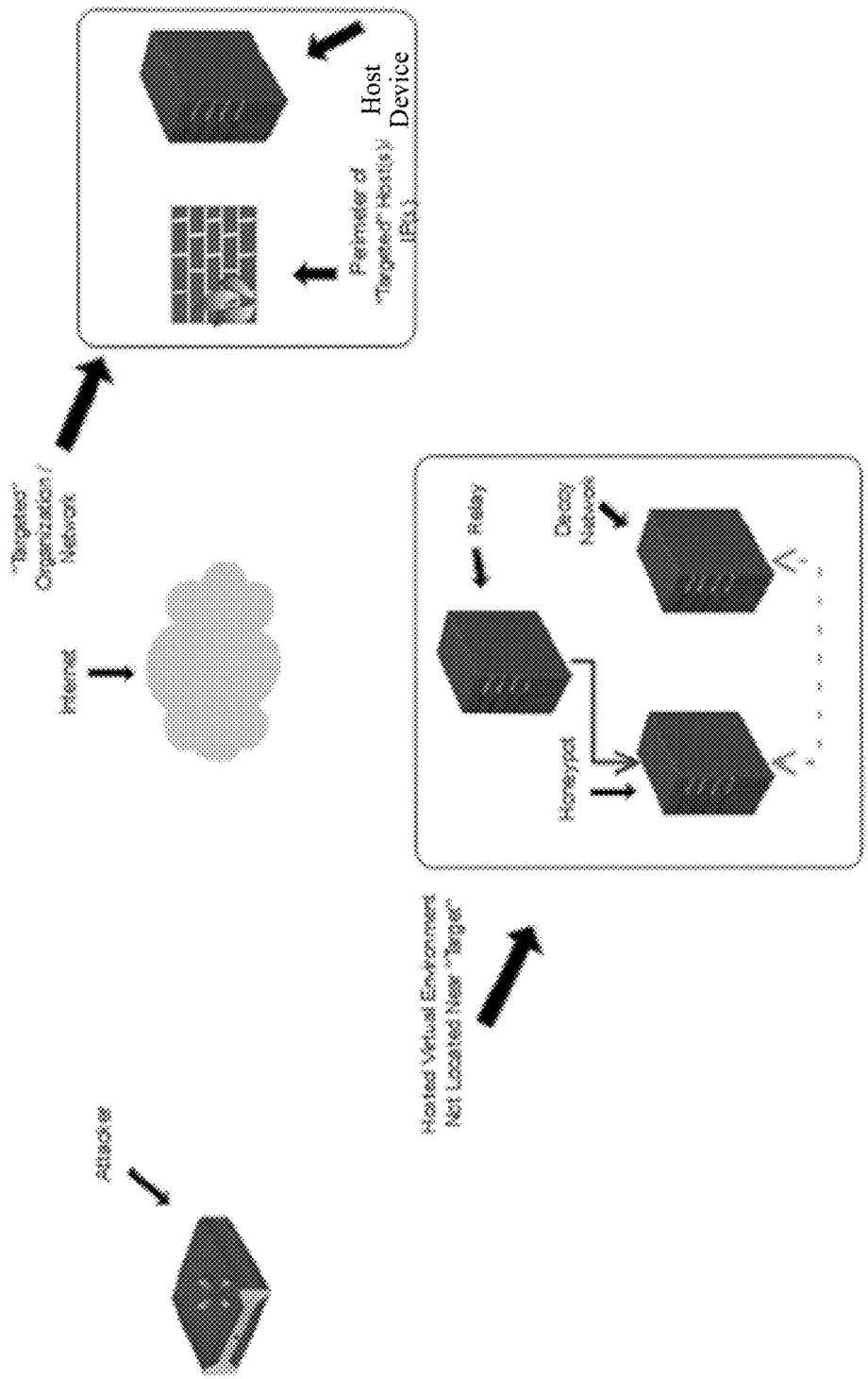
FIG. 7 illustrates that the VPN server forwards traffic across a TAP interface to the high- or low-interaction honeypot system.

The following steps detail how the teachings of the present disclosure may function. Step 1: the host device is placed into a network and the organization in which it resides provides a network connection to the host device. This may be a DMZ connection, or another connection can be placed in other network locations depending on the desired results. Traffic destined to the IP address assigned to the device is rerouted to the virtual honeypot. The host device initiates a VPN connection to a dedicated VPN server hosted at a separate physical location. The VPN server hosts a TAP interface to forward traffic received through the tunnel to the high- or low-interaction honeypot system. The high- or low-interaction honeypot and decoy network servers are connected via a virtual network. FIG. 4 illustrates how an attacker is positioned in relation to the host device, the target organization's network, and the virtual honeypot. Step 2: a hostile actor probes an organization's network in order to identify vulnerable systems that may provide a favorable target. As illustrated in FIG. 5, some of the attacker's probes are directed towards the host device. Step 3: the host device recognizes that the attacker has not yet, or not recently, been observed. The attacker's traffic is transparently relayed through the VPN tunnel, as shown in FIG. 6. Step 4: FIG. 7 illustrates how the VPN server forwards traffic across the TAP interface to the high or low-interaction honeypot system. Step 5: the attacker will use their tools to eventually gain access to the honeypot and use the system to scan for other servers and devices inside of the network's perimeter.

Figure 8:
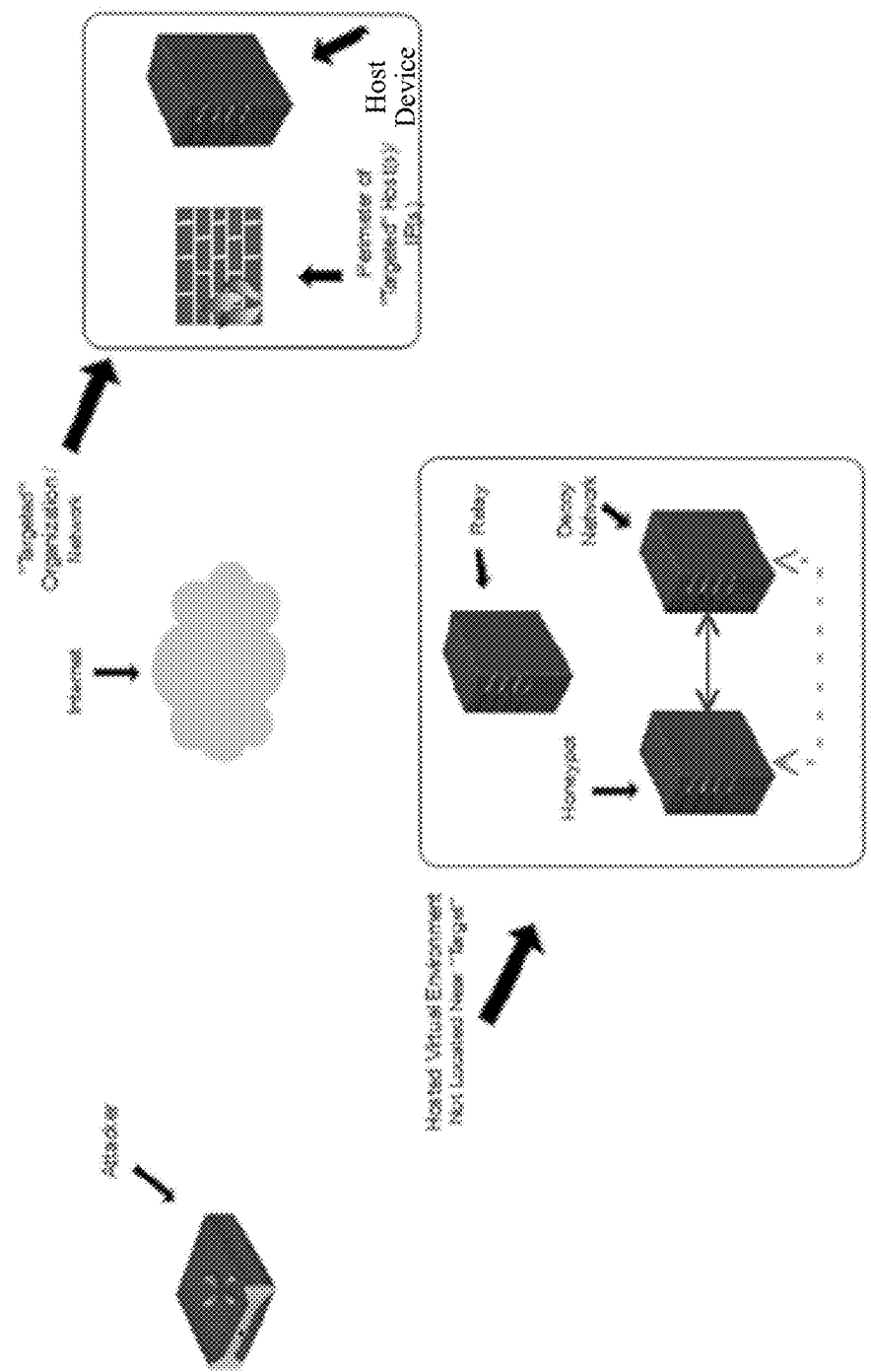
FIG. 8 illustrates that the attacker is confined within a virtual environment.
Figure 9:
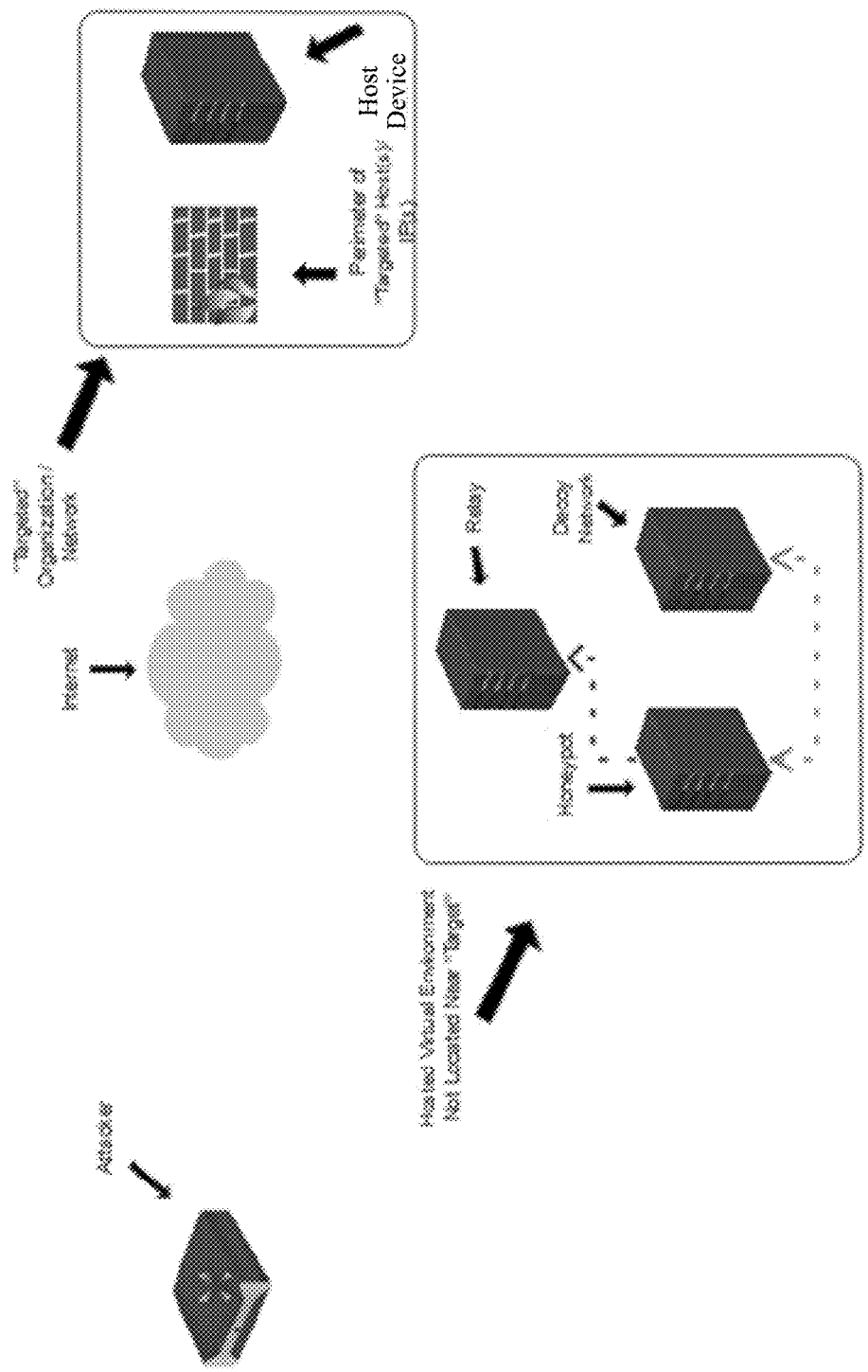
FIG. 9 illustrates how the attacker's traffic to and from the honeypot system is returned through the TAP.
Figure 10:
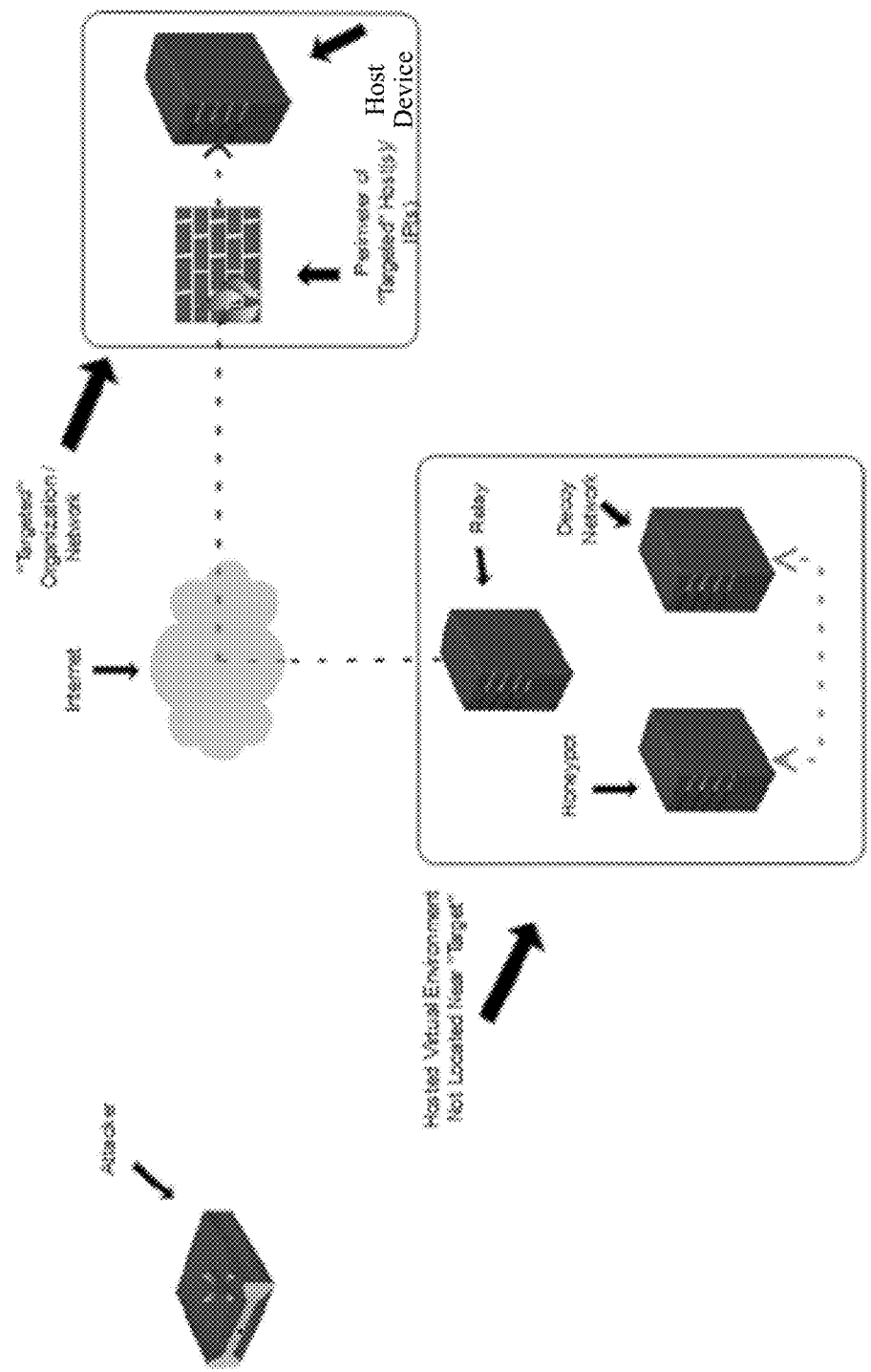
FIG. 10 illustrates that the attacker's traffic moves along the TAP and proceeds through the VPN tunnel.
Figure 11:
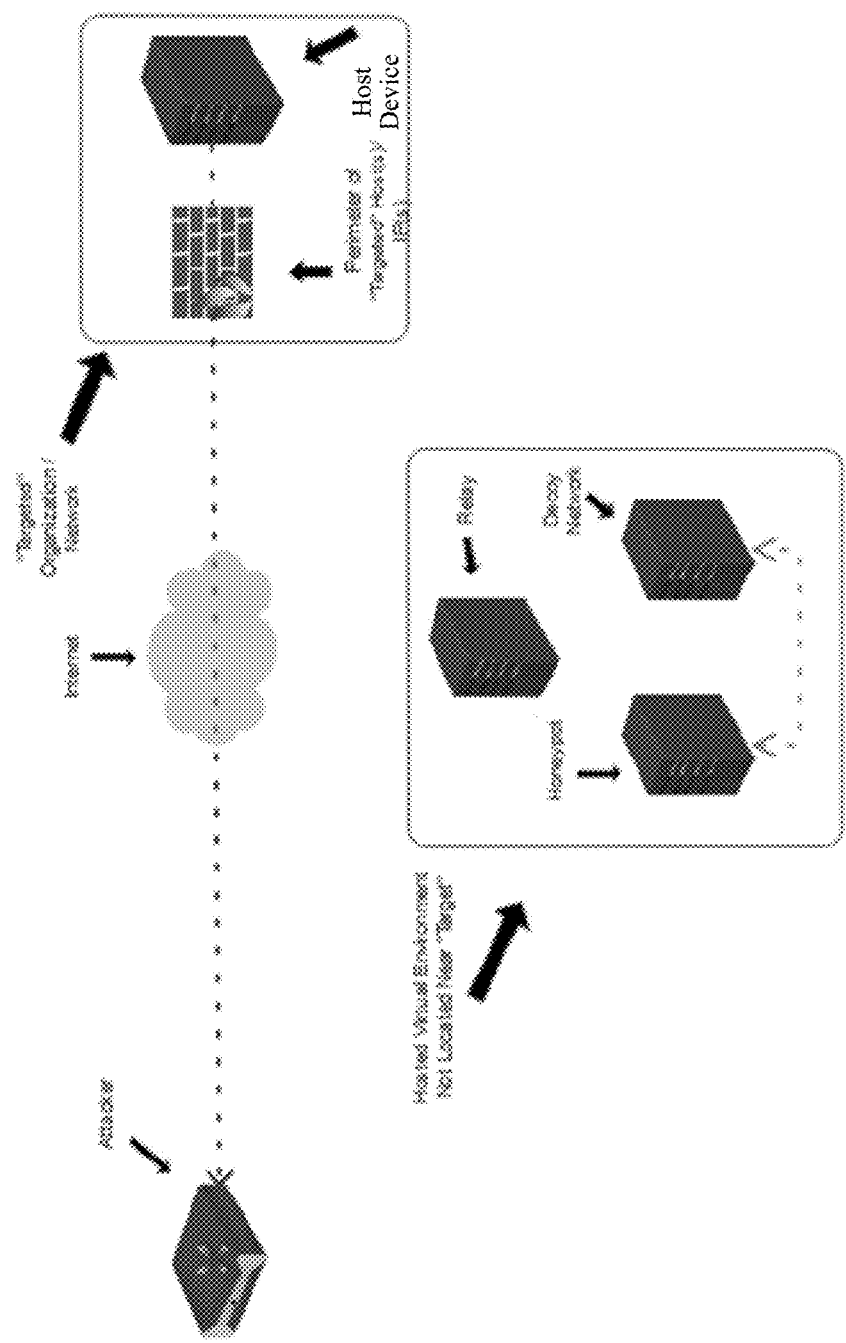
FIG. 11 illustrates how traffic is returned to the attacker to further ensure that they believe they have successfully penetrated the target organization.
Figure 12:
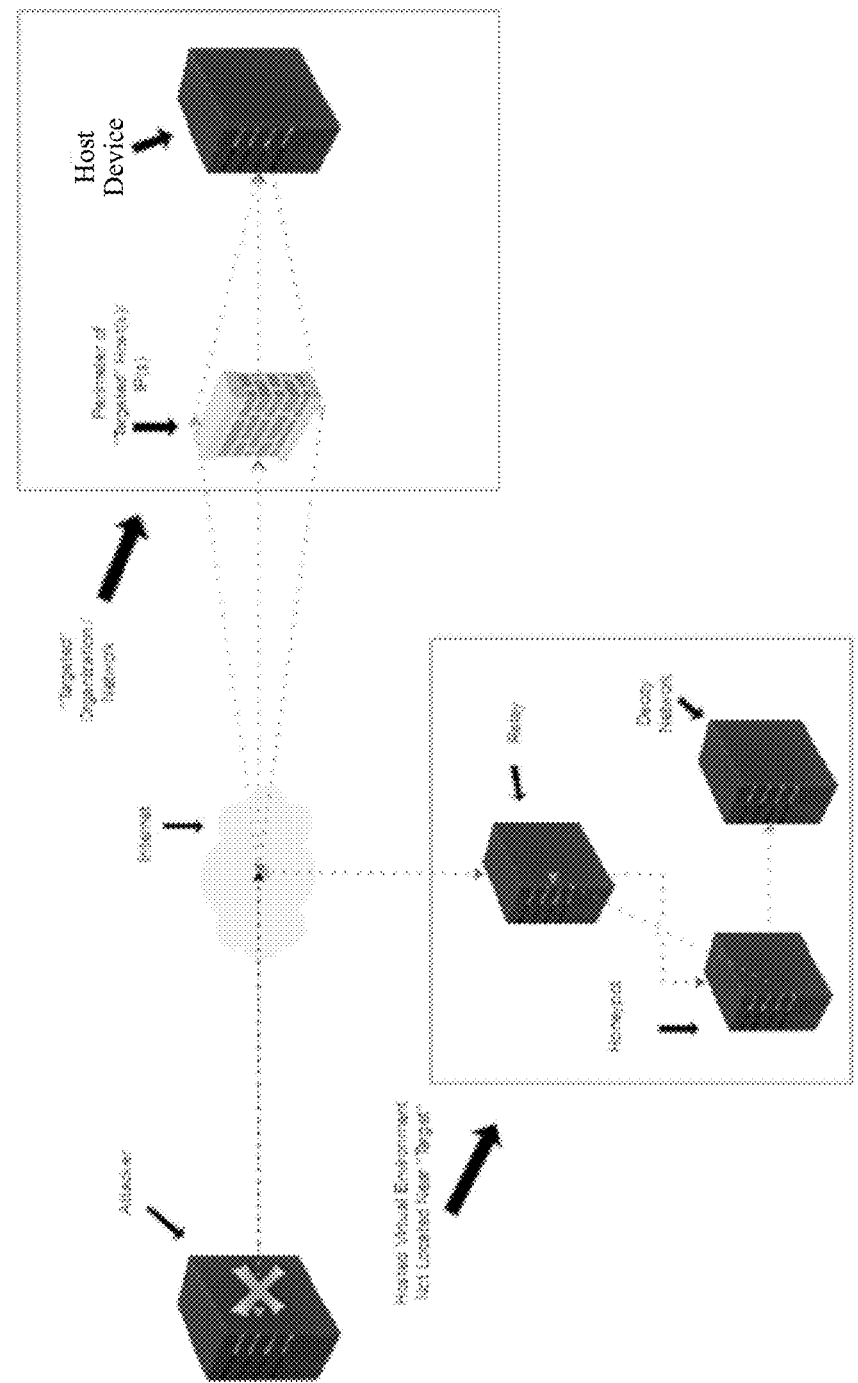
FIG. 12 illustrates a detailed overview of the network layout.

The attacker believes that they have gained access to a server within the organization's environment while in reality being confined to the virtual environment, as seen in FIG. 8. Step 6: the attacker's traffic to and from the honeypot system is returned through the TAP, as illustrated in FIG. 9. Step 7: the attacker's traffic moves along the tap and proceeds through the VPN tunnel, as illustrated in FIG. 10. Step 8: the attacker is satisfied that the traffic has (seemingly) returned from the organization target, that they have successfully compromised a server, and that they have conducted reconnaissance within the organization's perimeter, as shown in FIG. 11. A detailed overview of the network layout is provided in FIG. 12.

Figure 13:
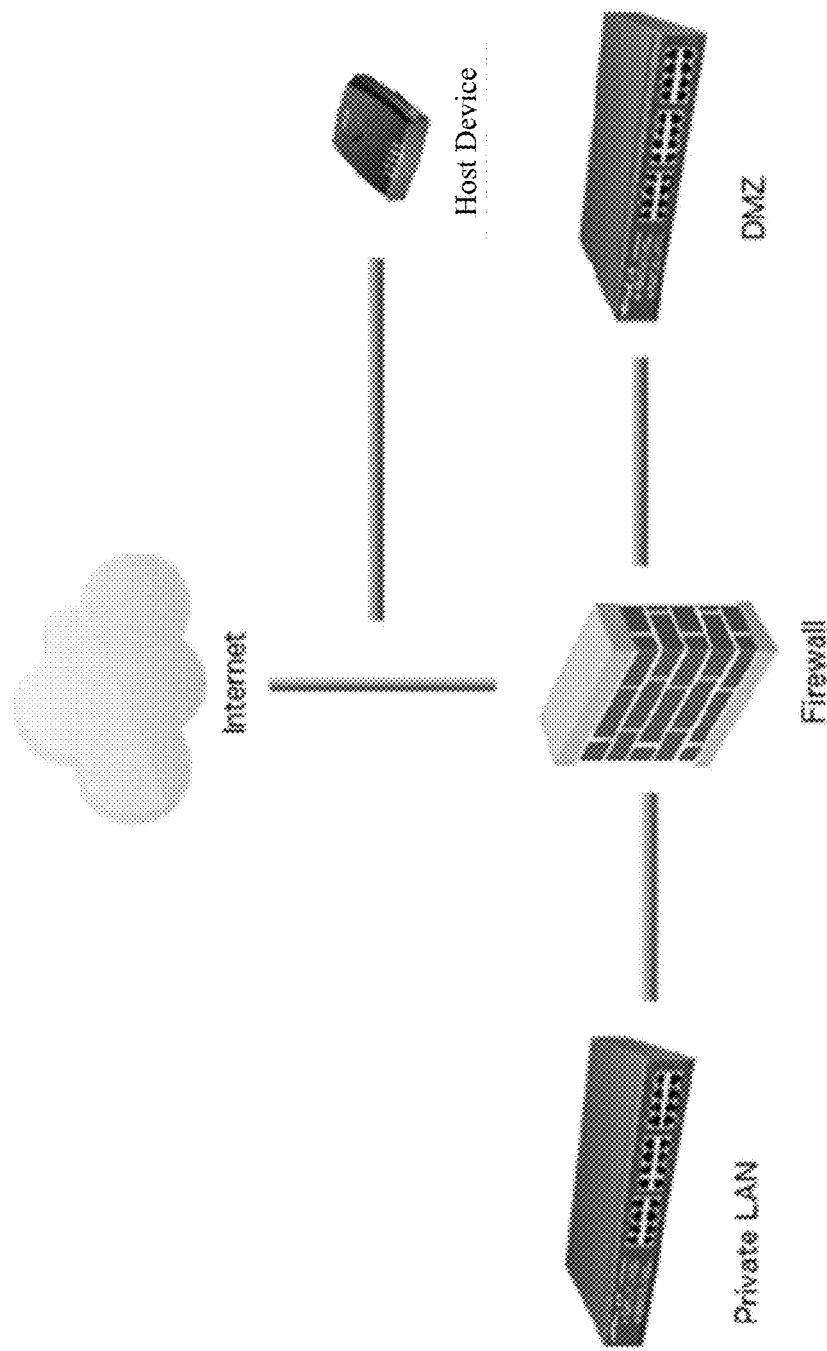
FIG. 13 illustrates the placement of the host device outside of the network.

A benefit of the host device is that it can be placed in any segment of a computer network. Different network designs and placements of the host device will attract different types of threats and gather different types of data. As illustrated in FIG. 13, the host device can be placed outside of the organization's network. Placing the host device outside of the network perimeter (i.e., public-facing Internet) allows the host device to relay or proxy attacks to the virtual honeypot with the least amount of risk. In this scenario, the host device sits out in the open on the public Internet and is not protected by the organization's security infrastructure. This is typically the easiest setup as it does not require any modifications to the organization's network infrastructure and allows for open and unhindered communications to the Internet.

Figure 14:
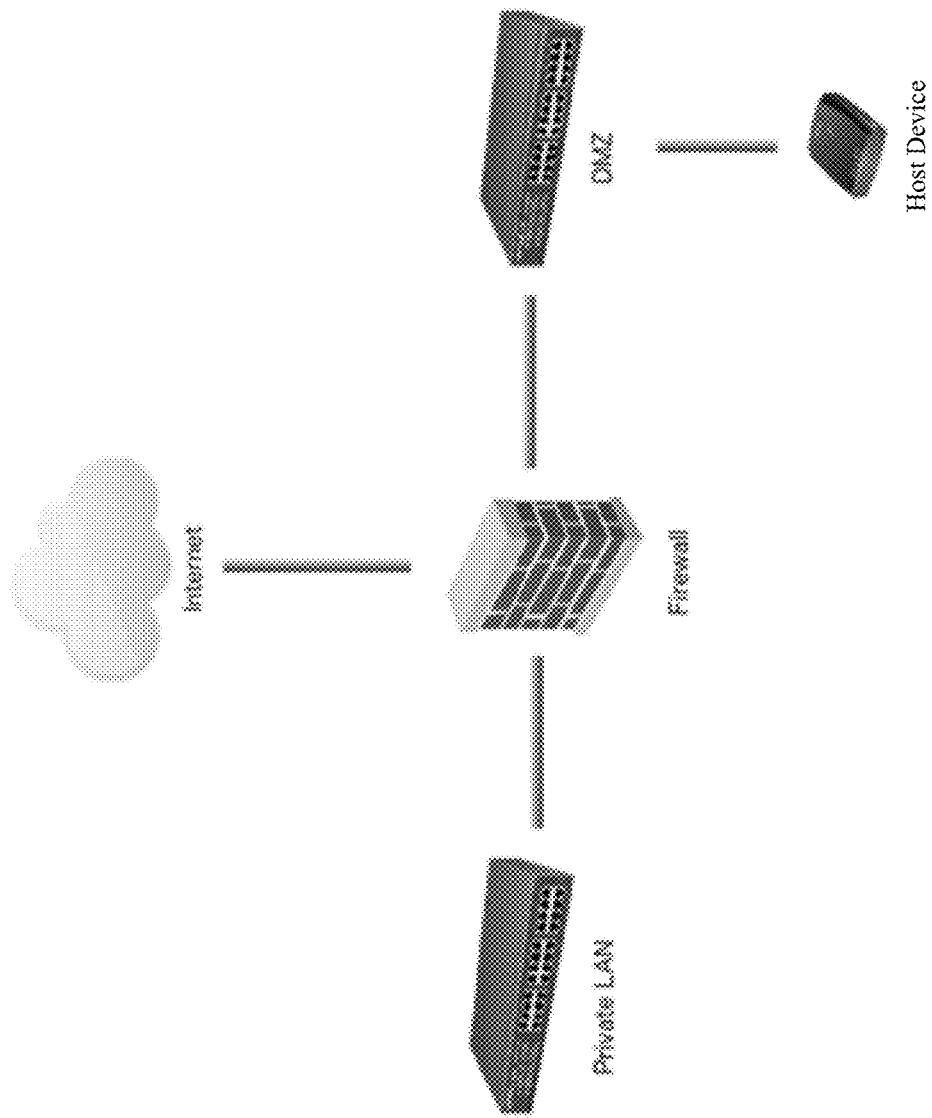
FIG. 14 illustrates the placement of the host device inside a DMZ.

The host device can also be placed inside a DMZ, as shown in FIG. 14. Placement of the host device within an organization's DMZ has the advantage that it closely mimics a normal networking landscape. The host device is treated as any other externally-facing asset to the organization. For example, the host device might sit alongside legitimate company web and e-mail servers. This type of configuration requires more setup but more closely mimics a system functioning normally within an organization and with legitimate network configurations. From the external attacker's point of view, the host device appears to be part of the organization's normal network.

Figure 15:
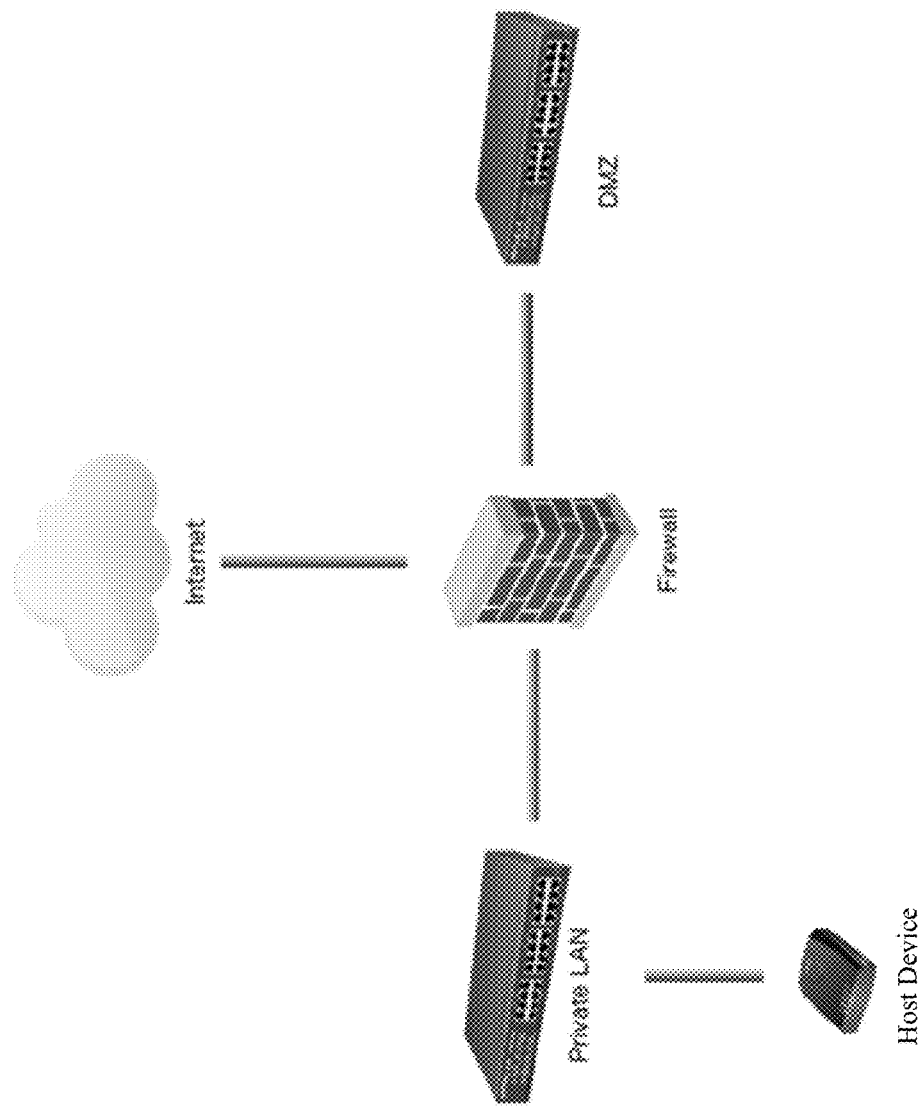
FIG. 15 illustrates the placement of the host device in an internal network/inside local area network.

Placement of the host device within a private network or local area network that is not directly accessible via external sources, as illustrated in FIG. 15, is useful in locating threats within an organization. If an attacker already has access to an internal network, the host device can act as a relay or proxy to redirect the attacker off premises to the virtual honeypot. When the attacker locates the host device within an internal network, data can be collected by the host device and relayed to the organization's security staff. Since the host device presents the attacker with a virtual honeypot, they are more likely to spend time within the virtual environment rather than the real target network. Although it will appear to the attacker that they have compromised the host device within the network, the attack is actually located outside of the organization.

Figure 16:
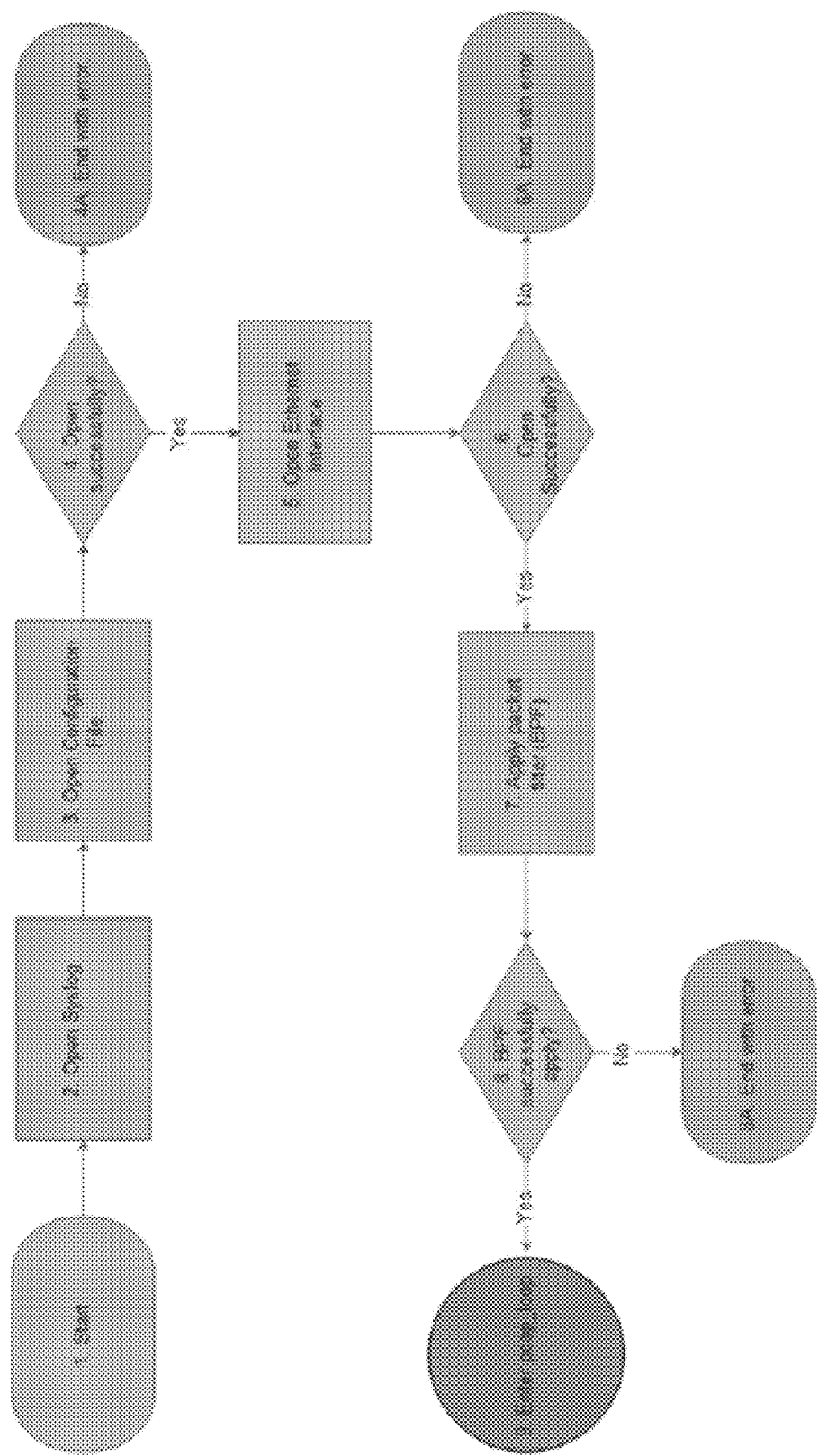
FIG. 16 illustrates device software start-up.

The host device may run software designed to filter attackers based on previously collected data. FIG. 16 illustrates the start-up of the software. Step 1: the software is executed after boot-up of the host device. Step 2: syslog is opened and used to generate and store program and system messages. The host device software uses syslog to store status messages and results of lookups. Step 3: the host device software configuration file is opened. This file contains configurations that inform the software on how long to block/firewall IP addresses, user-agents, device IDs, Berkeley Packet Filter (BPF) options, Threat Intel URLs, Threat Intel API keys, and IP address categories to block. Step 4: the configuration file is tested. Step 4A: if Step 4 is failed, the user is presented with an error. Possible reasons for failure are that the configuration file cannot be opened due to permission, incomplete configuration, lack of a configuration file, or syntax errors within the configuration file. Upon successful reading of the configuration file, values are stored in the program's memory. Step 5: the ethernet port is opened. Information regarding which ethernet port is to open is supplied by the configuration file or the default software value of "eth0". The host device is then opened in promiscuous mode so that the program can intercept traffic passing through the host device, also known as "sniffing" traffic. Step 6: tests are performed to determine if the ethernet port was successfully opened. Testing includes whether the host device could be opened and could be put into promiscuous mode. Step 6A: if Step 6 fails, the user is presented with an error. Step 7: the BPF is applied which tells the software how to intercept traffic that passes through it. Step 8: tests are conducted to determine if the BPF was correctly applied. Step 8A: if Step 8 fails, the user is presented with an error. Failures could be caused by incorrect BPF syntax. Step 9: the endless packet capture "pcap_loop" is entered.

Figure 17:
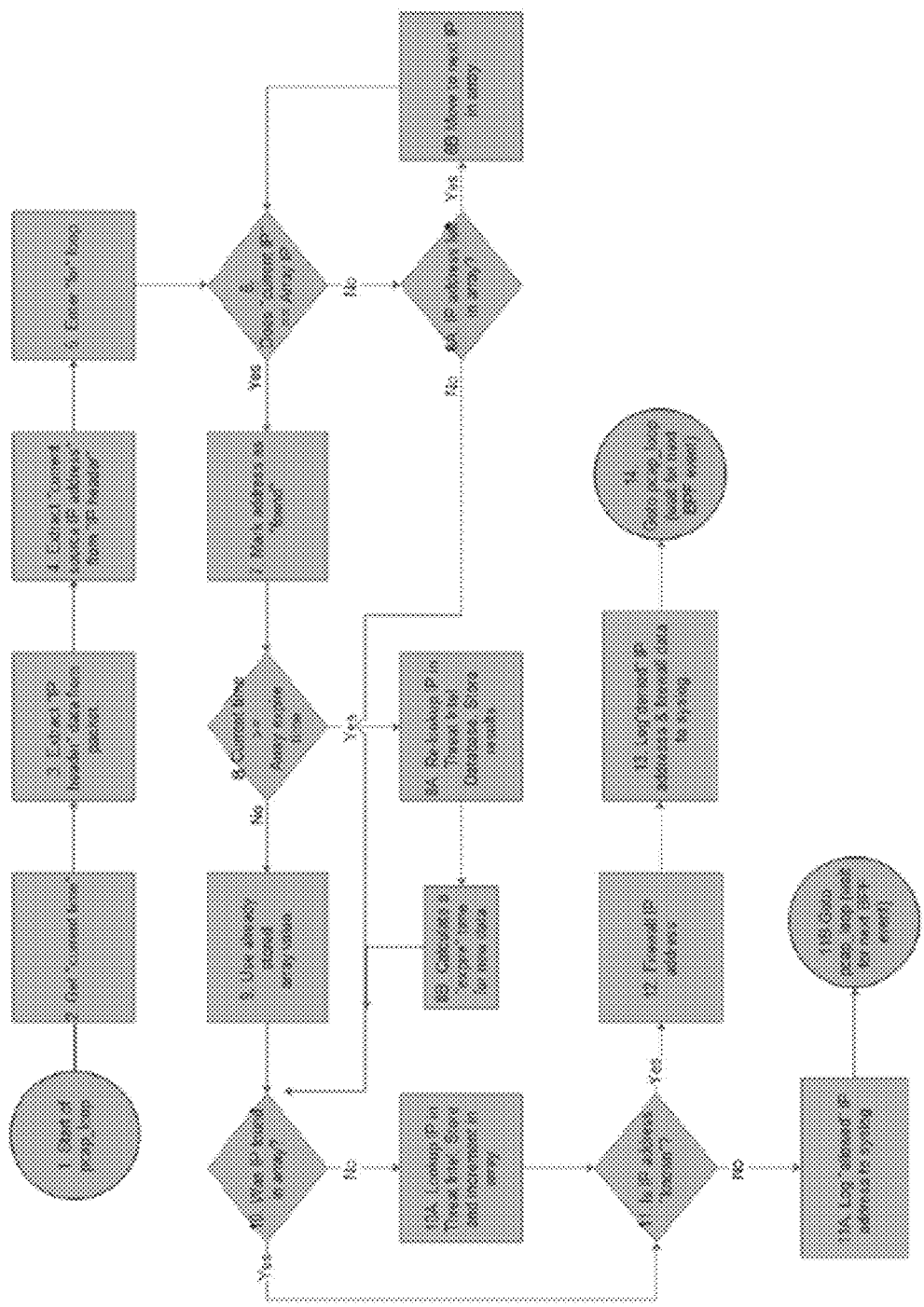
FIG. 17 illustrates the device software in packet capture loop.

Once the packet capture loop is entered, the following process is initiated (as illustrated in FIG. 17): Step 1: the endless "pcap_loop" is entered. Packets that pass the BPF are passed to this subroutine. Step 2: the "current" time (stored as epoch time) is recorded; the time the packet was received is stored in the host device software memory. Step 3: the IP header is extracted from the packet. Step 4: the source IP address is extracted from the IP header. The source IP address is stored in the host device software memory. Step 5: the "for" loop is entered. This loop cycles through all previous source IP addresses that the software has processed. Step 6: testing is conducted to determine whether the current IP address equals the current position in the previous source IP addresses array. Step 6A: tests determine whether there are any more IP addresses in the host device software memory to check. Step 6B: the next IP address in the host device software array is examined. Loop to Step 6. Step 7: If Step 6 is passed, a boolean or flag is set to demarcate where the address was found in the IP host device software array. This can later be used to determine whether or not the current source IP address was found in the host device software array. Step 8: tests determine if the current time of the packet is greater than or equal to the expire-time of the IP address found in the host device software arrays. Step 8A: if the IP address in the host device software array is older than the expire-time, a new look-up from the Threat Intelligence database via API call is performed. Then, the old data is replaced with the new lookup data. Step 8B: a new expire-time is calculated which determines when the data are considered "stale" and need to be looked-up again. Step 9: if the data have not expired, the previously stored data about the IP address already stored in the array is used. Step 10: tests determine if the current IP address was found in the host device software IP address array. The boolean flag set in Step 7 is checked here to determine the answer. Step 10A: if the IP address was not found in the host device software array, a lookup from the Threat Intelligence database via an API call is performed. Step 11: tests determine if the Threat Intelligence API lookup resulted in an unknown or an ignore value which will determine if the host device allows the connection to be made to the virtualized honeypot. Step 11A: if the IP address has not been seen before or it is not currently in the Threat Intelligence database, the new connection to syslog is recorded. Nothing is done with the network traffic as it is allowed through to the virtual honeypot environment. Step 11B: if the address has been seen before, the process starts back with Step 1 and restarts the infinite loop that waits for new network traffic. Step 12: if the IP address has been identified in the past, the Threat Intelligence API will return a result code to ignore this host. The host device preforms a firewall block and does not allow the connection to the virtual honeypot environment to be made. Step 13: the IP address of the denied network connection is sent to the virtual honeypot to syslog. Step 14: the process starts again with Step 1.

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. A system implementing security within a customer network, comprising:
    a virtual honeypot;
    a threat intelligence database including a lookup table storing historical attack information associated with unsophisticated network attackers, the historical attack information including Internet Protocol (IP) address information; and
    a host device in communication with the customer network, the virtual honeypot and the threat intelligence database, the host device:
        receiving traffic from an attacker IP address via the Internet;
        determining whether the attacker IP address corresponds to an IP address stored within the threat intelligence database;
        ceasing connection, internally within the host device, with the attacker IP address when the attacker IP address is stored within the threat intelligence database; and
        routing data, internally within the host device, between the attacker IP address and the virtual honeypot when the attacker IP address is not stored within the threat intelligence database.

2. The system of claim 1, wherein the host device further presents the attacker IP address with data indicating a compromised network when the virtual honeypot is compromised.

3. The system of claim 1, wherein the virtual honeypot is a secured virtual environment which mirrors the customer network configuration, and is located outside of the customer network.

4. The system of claim 1, wherein the virtual honeypot is a low-interactive honeypot appearing vulnerable to certain types of attacks without allowing full interaction with the virtual honeypot.

5. The system of claim 1, wherein the virtual honeypot is an interactive honeypot allowing an attacker full control and access to the virtual honeypot, giving an appearance of being vulnerable to certain types of attacks.

6. The system of claim 5, said interactive honeypot allowing collection of data on tactics or techniques used by the attacker.

7. The system of claim 1, wherein during an attack by an attacker, the attacker is given visibility into a virtualized organization network that mimics the infrastructure of the customer network targeted by the attack.

8. The system of claim 7, wherein if the attacker attempts to exfiltrate data out of the virtual honeypot, all traffic is passed back through the customer network giving the attacker an illusion that the attack has successfully penetrated the customer network.

9. A method for implementing security within a customer network, comprising:
    providing a virtual honeypot;
    providing a threat intelligence database including a lookup table storing historical attack information associated with unsophisticated network attackers, the historical attack information including Internet Protocol (IP) address information; and
    providing a host device in communication with the customer network, the virtual honeypot and the threat intelligence database, the host device:
        receiving traffic from an attacker IP address via the Internet;
        determining whether the attacker IP address corresponds to an IP address stored within the threat intelligence database;
        ceasing connection, internally within the host device, with the attacker IP address when the attacker IP address is stored within the threat intelligence database; and
        routing data, internally within the host device, between the attacker IP address and the virtual honeypot when the attacker IP address is not stored within the threat intelligence database.

10. The method of claim 9, the host device further presenting the attacker IP address with data indicating a compromised network when the virtual honeypot is compromised.

11. The method of claim 9, wherein the virtual honeypot is a secured virtual environment which mirrors the customer network configuration, and is located outside of the customer network.

12. The method of claim 9, wherein the virtual honeypot is an interactive honeypot appearing vulnerable to certain types of attacks without allowing full interaction with the virtual honeypot.

13. The method of claim 9, wherein the virtual honeypot is an interactive honeypot allowing an attacker full control and access to the virtual honeypot, giving an appearance of the virtual honeypot being vulnerable to certain types of attacks.

14. The method of claim 13, said interactive honeypot allowing collection of data on tactics or techniques used by the attacker.

15. The method of claim 9, wherein during an attack by an attacker, the attacker is presented with a computer system and is given visibility into a virtualized organization network that mimics the infrastructure of the customer network targeted by the attack.

16. The method of claim 15, wherein if the attacker attempts to exfiltrate data out of the virtual honeypot, all traffic is passed back through the customer network giving the attacker the illusion that the attack has successfully penetrated the customer network.

17. An apparatus for implementing security within a customer network, comprising:
    a memory storing a threat intelligence database including a lookup table comprising historical attack information associated with unsophisticated network attackers, the historical attack information including Internet Protocol (IP) address information;

at least one processor operatively coupled to the memory; and a host device operatively coupled to the at least one processor, the host device in communication with the customer network, the threat intelligence database and a device adapted to attract attacks, wherein the at least one processor causes the host device to:

receive traffic from an attacker IP address via the Internet;

determine whether the attacker IP address corresponds to an IP address stored within the threat intelligence database;

cease connection, internally within the host device, with the attacker IP address when the attacker IP address is stored within the threat intelligence database; and route data, internally within the host device, between the attacker IP address and the device adapted to attract attacks when the attacker IP address is not stored within the threat intelligence database.

18. The apparatus of claim 17, wherein the host device further presents the attacker IP address with data indicating a compromised network when the device adapted to attract attacks is compromised.

19. The apparatus of claim 17, wherein the device adapted to attract attacks is a secured virtual environment which mirrors the customer network configuration, and is located outside of the customer network.

20. The apparatus of claim 17, wherein the device adapted to attract attacks is one of an interactive honeypot giving an appearance of being vulnerable to certain types of attacks without allowing full interaction with the device adapted to attract attacks or an interactive honeypot allowing an attacker full control and access to the device adapted to attract attacks.

* * * * *